(12) United States Patent
Suzuki et al.

(10) Patent No.: US 8,784,078 B2
(45) Date of Patent: Jul. 22, 2014

(54) INTEGRATED-INVERTER ELECTRIC COMPRESSOR

(75) Inventors: Manabu Suzuki, Aichi (JP); Ichiro Yogo, Aichi (JP); Tomoyasu Osaki, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 210 days.

(21) Appl. No.: 12/991,007

(22) PCT Filed: Jun. 10, 2009

(86) PCT No.: PCT/JP2009/060642
§ 371 (c)(1),
(2), (4) Date: Nov. 4, 2010

(87) PCT Pub. No.: WO2010/026816
PCT Pub. Date: Mar. 11, 2010

(65) Prior Publication Data
US 2011/0091337 A1 Apr. 21, 2011

(30) Foreign Application Priority Data
Sep. 8, 2008 (JP) .................. 2008-229521

(51) Int. Cl.
*F04B 17/03* (2006.01)
*H01J 5/00* (2006.01)

(52) U.S. Cl.
USPC .................. 417/423.14; 174/50.5

(58) Field of Classification Search
USPC ............. 417/410.1, 423.14; 174/50.5
See application file for complete search history.

(56) References Cited

U.S. PATENT DOCUMENTS 6,455,768 B2 * 9/2002 Negishi .................. 174/17 CT
7,112,045 B2 * 9/2006 Kimura et al. ............ 417/371
(Continued)

FOREIGN PATENT DOCUMENTS

CN 1854520 A 11/2006
CN 1912364 A 2/2007
(Continued)

OTHER PUBLICATIONS

Japanese Office Action dated Apr. 24, 2012, issued in corresponding application 2008-229521, with English Translation.(6 pages).
(Continued)

*Primary Examiner* — Charles Freay
(74) *Attorney, Agent, or Firm* — Westerman, Hattori, Daniels & Adrian, LLP

(57) ABSTRACT

An integrated-inverter electric compressor in which an inverter accommodating section (9) is provided on the periphery of a housing, an inverter that supplies driving power to an electric motor is installed in the inverter accommodating section (9), and its opening (10) is tightly sealed with a cover (13) is configured such that a groove (16) in which a liquid sealant (20) is to be filled is provided in a flange (11) around the opening (10); the liquid sealant (20) filled in the groove (16) is cured to tightly seal a joint surface between the flange (11) and the cover (13); and when the width of a joint surface (17) formed at the inner periphery of the groove (16) in the flange (11) is L1 and the width of a joint surface (18) formed at the outer periphery of the groove (16) is L2, L1<L2 holds.

4 Claims, 5 Drawing Sheets

(56) References Cited

U.S. PATENT DOCUMENTS

| | | | |
|---|---|---|---|
| 7,561,435 B2* | 7/2009 | Kamoshida et al. | 361/752 |
| 2001/0040037 A1 | 11/2001 | Negishi | |
| 2004/0013543 A1 | 1/2004 | Kimura et al. | |
| 2006/0056998 A1* | 3/2006 | Gray et al. | 417/413.1 |
| 2008/0002377 A1 | 1/2008 | Kamoshida et al. | |

FOREIGN PATENT DOCUMENTS

| | | |
|---|---|---|
| JP | 57-092042 U1 | 11/1980 |
| JP | 60-40868 A | 3/1985 |
| JP | 60-237267 A | 11/1985 |
| JP | 61-183447 U | 11/1986 |
| JP | 4-19373 A | 1/1992 |
| JP | 9-137859 A | 5/1997 |
| JP | 2005-114064 A | 4/2005 |
| JP | 3827158 B2 | 9/2006 |
| JP | 3828683 B2 | 10/2006 |
| JP | 2008-128142 A | 6/2008 |
| JP | 2008-131792 A | 6/2008 |

OTHER PUBLICATIONS

International Search Report of PCT/JP2009/060642, mailing date Jul. 14, 2009.

Chinese Office Action dated Feb. 7, 2013, issued in corresponding Chinese Patent Application No. 200980119145.0, English translation (13 pages).

Decision to Grant a Patent dated Apr. 2, 2013, issued in corresponding Japanese Patent Application No. 2008-229521 (3 pages).

Japanese Office Action dated Dec. 11, 2012, issued in corresponding Japanese Patent Application No. 2008-229521, (6 pages). With English Translation.

Chinese Office Action dated Sep. 23, 2013, issued in Chinese Patent Application No. 2009801191450, w/ English translation.

* cited by examiner

INTEGRATED-INVERTER ELECTRIC COMPRESSOR

TECHNICAL FIELD

The present invention relates to an integrated-inverter electric compressor in which an inverter is integrally installed and which is applied to a compressor of a vehicle air conditioner.

BACKGROUND ART

The widespread use and development of hybrid vehicles, electric vehicles, fuel-cell vehicles, etc. have been active in recent years. For vehicle air conditioners mounted in such vehicles, an integrated-inverter electric compressor accommodating an electric motor is employed instead of an open-type compressor that is driven by motive power from an engine. The integrated-inverter electric compressor is configured such that an inverter accommodating section is provided on the periphery of a housing that accommodates an electric motor and a compression mechanism, and an inverter that converts DC power supplied from a high-voltage power supply to three-phase AC power and feeds the three-phase AC power to the electric motor through glass-sealed terminals is installed in the inverter accommodating section (for example, refer to Patent Literature 1).

As shown in Patent Literature 1, the inverter accommodating section is generally configured such that after the inverter is installed, an opening is tightly sealed with a cover. In this case, to ensure its sealing performance, the sealing is performed such that a sealant called a liquid gasket is applied on the joint surface between the inverter accommodating section and the cover. Meanwhile, as a technique for sealing by joining the joint surfaces such as flanges with a sealant, a sealing technique involving filling a groove provided in the joint surface with a sealant called a liquid gasket and curing it to form a thick film of the sealant in the gap between the joint surfaces has been proposed (for example, refer to Patent Literature 2).

CITATION LIST

Patent Literature

{PTL 1} The Publication of Japanese Patent No. 3827158
{PTL 2} The Publication of Japanese Patent No. 3828683

SUMMARY OF INVENTION

Technical Problem

Since integrated-inverter electric compressors applied to vehicle air conditioners are installed under severe environments, such as an engine compartment, the inverter accommodating section requires sufficient waterproofing performance. Thus, as described above, a sealant, such as a liquid gasket, is applied in a gap formed, in the course of nature, in the joint surfaces between the flange of the inverter accommodating section and the cover to achieve tight sealing; however, even if such a sealing structure is employed, it is difficult to apply the sealant uniformly, and thus the variations thereof make it difficult to ensure high-precision uniform sealing performance, and there is a risk of the inverter accommodating section getting wet.

Furthermore, even if a sealing technique like that disclosed in Patent Literature 2 is adopted, when the sealant, such as a liquid gasket, filled in the groove is pressed out due to the pressure contact of the joint surfaces, to which side of the groove the sealant is pressed out cannot be specified, and the variation thereof influences formation of the sealing film, thus causing variations in sealing performance. Therefore, even if the sealing technique of Patent Literature 2 is applied without modification, a reliable waterproof structure of the inverter accommodating section cannot necessarily be obtained.

The present invention is made in consideration of such circumstances, and an object thereof is to provide an integrated-inverter electric compressor that is capable of reliably enhancing the waterproofing performance of an inverter accommodating section by making it less prone to the vibrations in sealing performance.

Solution to Problem

To solve the problems described above, an integrated-inverter electric compressor of the present invention employs the following solutions.

Specifically, an integrated-inverter electric compressor according to an aspect of the present invention is configured such that an inverter accommodating section is provided on the periphery of a housing accommodating an electric motor and a compression mechanism, an inverter that supplies driving power to the electric motor is installed in the inverter accommodating section, and its opening is tightly sealed with a cover, wherein a groove in which a liquid sealant is to be filled is provided in a flange around the opening of the inverter accommodating section; the liquid sealant filled in the groove is cured to tightly seal a joint surface between the flange and the cover; and when the width of a joint surface formed at the inner periphery of the groove in the flange is L1 and the width of a joint surface formed at the outer periphery of the groove is L2, L1<L2 holds.

According to the aspect of the present invention, the joint surface between the flange and the cover can be tightly sealed by filling a liquid sealant into the groove provided in the flange around the opening of the inverter accommodating section, and by curing the liquid sealant. In this case, since the width L1 of the joint surface formed at the inner periphery of the groove provided in the flange relative to the width L2 of the joint surface formed at the outer periphery of the groove is such that L1<L2, the liquid sealant pressed out from the groove due to contact pressure when the cover is fastened is pressed out mainly to the joint surface at the inner periphery owing to a difference in resistance due to the difference between the widths L1 and L2 of the joint surfaces and remains at the inner peripheral edge due to surface tension, where it is cured. This allows the sealant to be cured at two positions, that is, the groove and the inner peripheral edge of the flange, to form double sealing films to thereby ensure a sufficient width, thereby tightly sealing the inverter accommodating section with the cover, thus reliably enhancing the waterproofing performance of the inverter accommodating section. Furthermore, this can prevent the sealant from being squeezed out to the outer peripheral surface of the compressor, thus improving the external appearance.

Furthermore, the integrated-inverter electric compressor according to the above aspect may be configured such that, in the above integrated-inverter electric compressor, the groove is integrally formed by casting, in the flange of the inverter accommodating section during die-casting.

With the above configuration, since the groove is integrally formed by casting, in the flange of the inverter accommodating section during die-casting, there is no need to process the groove in the flange by machining, and the groove can be integrally formed by casting when the housing or the inverter accommodating section is formed by die-casting. This can therefore remarkably enhance the productivity as compared with forming the groove by machining and can reduce the production cost. Furthermore, by integrally forming the groove by casting, the relationship between the width L1 of the joint surface at the inner periphery of the groove and the width L2 of the joint surface at the outer periphery can inevitably be L1<L2 because of the construction of the molding dies.

Furthermore, the integrated-inverter electric compressor according to the above aspect may be configured such that, in one of the integrated-inverter electric compressors described above, the groove is provided at the inner periphery of screw holes provided in the flange for mounting the cover.

With the above configuration, since the groove is provided at the inner periphery of the screw holes provided in the flange for mounting the cover, a continuous groove can be easily formed around substantially the whole circumference of the flange without being obstructed by the screw holes for mounting the cover. This can enhance the sealing performance, decrease the length of the groove as much as possible, and minimize the amount of liquid sealant necessary for sealing. Furthermore, since the cover is fastened via the screw holes provided at the outer periphery of the groove, the sealant can be reliably prevented from being squeezed out to the outer peripheral surface of the compressor.

Furthermore, the integrated-inverter electric compressor according to the above aspect may be configured such that, in one of the integrated-inverter electric compressors described above, the flange is configured such that the joint surface formed at the inner periphery of the groove is lower than the joint surface formed at the outer periphery of the groove.

With the above configuration, since the flange is configured such that the joint surface formed at the inner periphery of the groove is lower than the joint surface formed at the outer periphery of the groove, the liquid sealant pressed out from the groove due to contact pressure when the cover is fastened can be reliably introduced to the joint surface at the inner periphery through the minute gap formed between the lower joint surface at inner periphery and the cover. This allows the liquid sealant to be cured at two positions, that is, the groove and the inner peripheral edge of the flange, to form double sealing films, thereby tightly sealing the inverter accommodating section with the cover, and thus further enhancing the waterproofing performance of the inverter accommodating section. About 0.1 mm is adequate for the minute gap formed between the joint surface at the inner periphery and the cover.

Furthermore, the integrated-inverter electric compressor according to the above aspect may be configured such that, in one of the integrated-inverter electric compressors described above, the flange has a second groove, which is smaller than the groove, in the joint surface formed at the inner periphery of the groove.

With the above configuration, since the flange has the second groove, which is smaller than the groove to be filled with the liquid sealant, in the joint surface formed at the inner periphery of the groove, the liquid sealant pressed out from the groove due to contact pressure when the cover is fastened is collected in the second groove provided in the joint surface at the inner periphery, and the liquid sealant is cured in the two inside and outside grooves to form double sealing films, and thus, the inverter accommodating section can be tightly sealed with the cover. Thus, this can further enhance the waterproofing performance of the inverter accommodating section. The second groove should be a groove having a sufficiently smaller depth and width than the groove in which the liquid sealant is filled.

Furthermore, the integrated-inverter electric compressor according to the above aspect may be configured such that, in one of the integrated-inverter electric compressors described above, the cover is constituted of a damping steel plate.

With the above configuration, since the cover is constituted of a damping steel plate, not only can the waterproofing performance of the inverter accommodating section be improved but also vibrations and noise emitted outside through the inverter accommodating section can be reduced using the cover made of a damping steel plate. Accordingly, despite the use of the damping steel plate making it substantially difficult to process the cover to enhance the waterproofing performance, the waterproofing performance can be improved, and vibrations and noise can be reduced.

Advantageous Effects of Invention

According to the present invention, the liquid sealant pressed out from the groove due to contact pressure when the cover is fastened is pressed out mainly to the joint surface at the inner periphery owing to a difference in resistance due to the difference between the widths of the joint surfaces at the inner periphery and the outer periphery and remains at the inner peripheral edge due to surface tension, where it is cured. This allows the sealant to be cured at two positions, that is, the groove and the inner peripheral edge of the flange, to form double sealing films with a sufficient width, thereby tightly sealing the inverter accommodating section with the cover. Thus, this can reliably enhance the waterproofing performance of the inverter accommodating section. Furthermore, this can prevent the sealant from being squeezed out to the outer peripheral surface of the compressor, thus improving the external appearance.

DESCRIPTION OF EMBODIMENTS

Embodiments of the present invention will be described hereinbelow with reference to the drawings.

First Embodiment

A first embodiment of the present invention will be described hereinbelow with reference to FIGS. 1 to 4.

Figure 1:
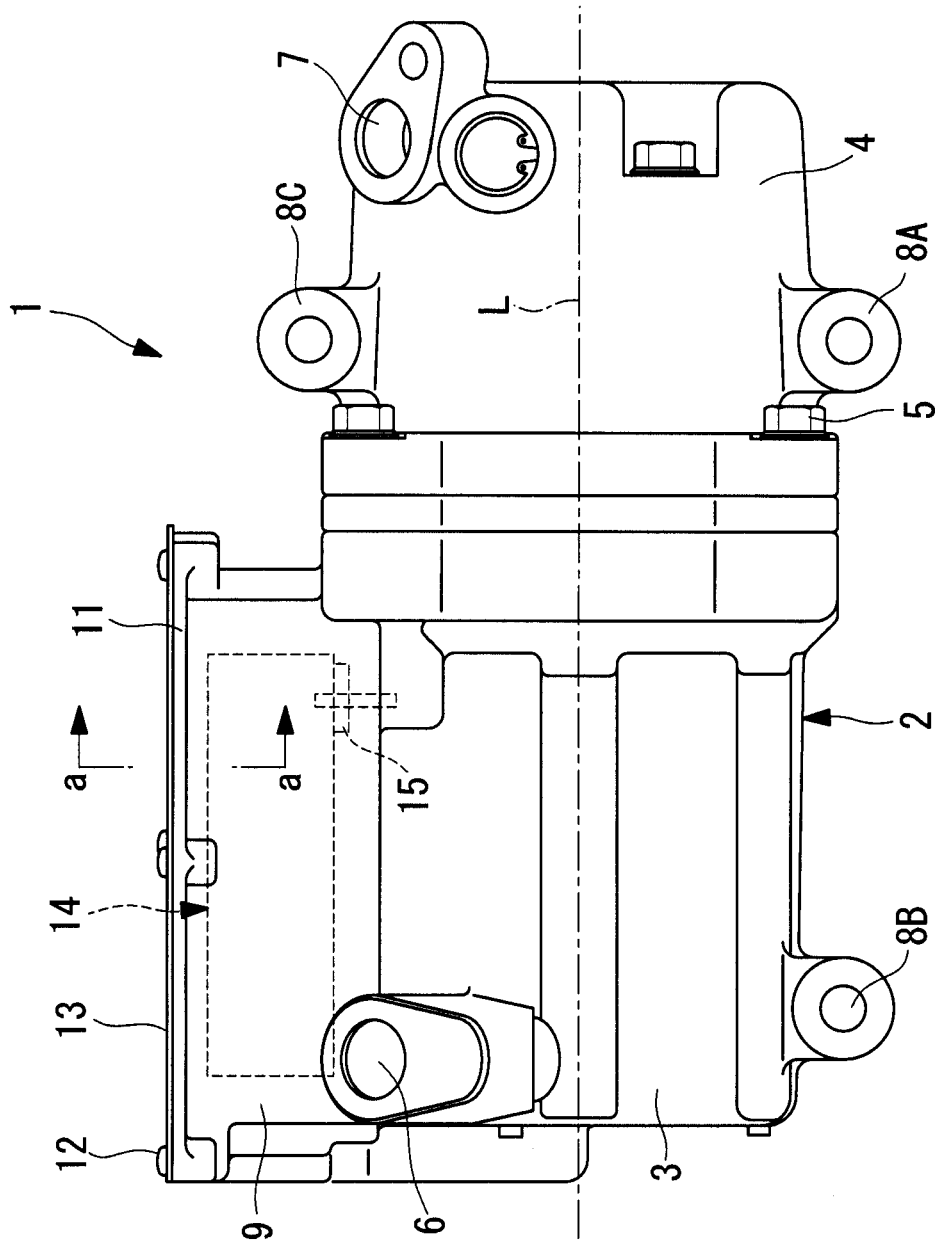
FIG. 1 is an external side view of an integrated-inverter electric compressor according to a first embodiment of the present invention.
Figure 2:
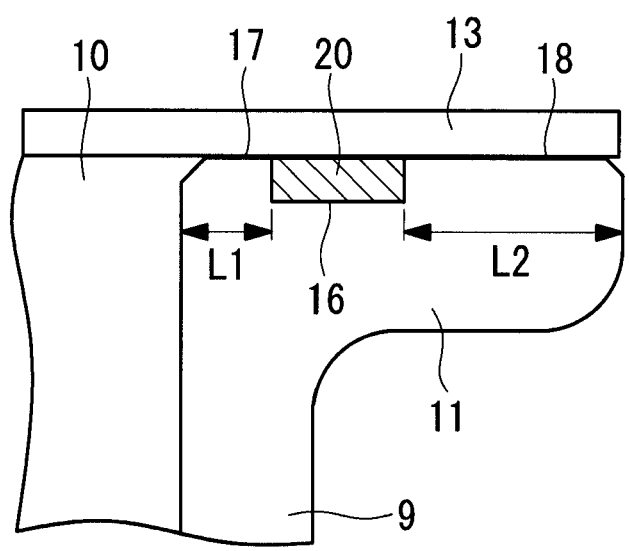
FIG. 2 is a cross-sectional view, taken along line a-a, of the integrated-inverter electric compressor shown in FIG. 1.
Figure 3:
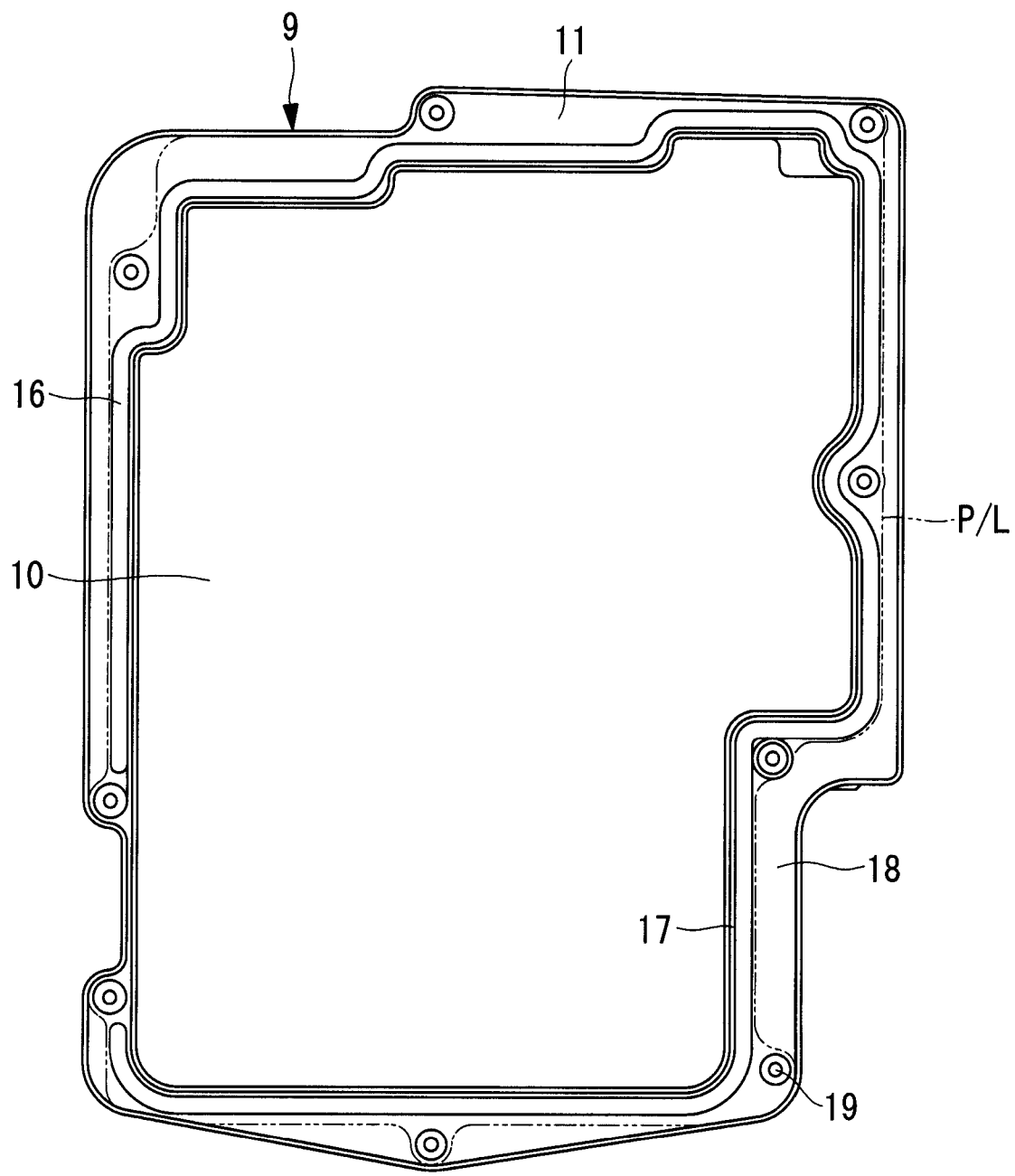
FIG. 3 is an end elevation at the opening side of an inverter accommodating section of the integrated-inverter electric compressor shown in FIG. 1.

FIG. 1 is an external side view of an integrated-inverter electric compressor according to the first embodiment of the present invention; FIG. 2 is a cross-sectional view taken along line a-a; and FIG. 3 is an end elevation of the opening side of an inverter accommodating section. The integrated-inverter electric compressor 1 includes a housing 2 that constitutes the outer casing thereof. The housing 2 is constructed by fastening together a motor housing 3 accommodating an electric motor (not shown) and a compressor housing 4 accommodating a compression mechanism (not shown) with bolts 5. The motor housing 3 and the compressor housing 4 are individually formed by aluminum die casting.

The electric motor and the compression mechanism accommodated in the housing 2 are joined together via a motor shaft and are configured such that the compression mechanism is driven by the rotation of the electric motor. A refrigerant intake port 6 is provided at one end of the motor housing 3 (at the left in FIG. 1), and low-temperature low-pressure refrigerant gas taken into the motor housing 3 through the refrigerant intake port 6 flows around the electric motor in the direction of a motor axis L and is then taken into the compression mechanism, where it is compressed. The high-temperature high-pressure refrigerant gas compressed by the compression mechanism is discharged into the compressor housing 4 and is then expelled outside through a discharge port 7 provided at one end of the compressor housing 4 (at the right in FIG. 1).

The housing 2 has mounting legs 8A, 8B, and 8C at three positions, two on the bottom at one end of the motor housing 3 and on the bottom at one end of the compressor housing 4, and one on the top of the compressor housing 4. The integrated-inverter electric compressor 1 is configured such that the mounting legs 8A, 8B, and 8C are fixed to side walls or the like of a device installed in the engine compartment of the vehicle with brackets and bolts.

A boxed-shaped inverter accommodating section 9 is integrally formed at the upper part on the periphery of the motor housing 3. The inverter accommodating section 9 has a box structure that is open at the top and is surrounded by a peripheral wall with a predetermined height, in which an opening 10 at the top is tightly sealed with a cover 13 made of a damping steel plate that is fixed with screws 12 to a flange 11 provided around the opening 10.

The inverter accommodating section 9 accommodates an inverter 14, so that the inverter 14 is integrally installed in the housing 2 of the electric compressor 1. As is well known, the inverter 14 has the function of converting DC power supplied from a high-voltage power supply through a power cable to three-phase AC power using a switching circuit and feeds the three-phase AC power, as driving power, to the electric motor through a glass-sealed terminal 15.

A groove 16 for tightly sealing the inverter accommodating section 9 is provided in the flange 11 provided around the opening 10 of the inverter accommodating section 9. The groove 16 is to be filled with a curable liquid sealant 20 known as a liquid gasket (for example, a silicone-based liquid gasket with product No. 1207d having silicone as the main component, made by ThreeBond Co. Ltd.), which is highly heat-resistant and suitable for sealing a joint that is subjected to high temperature, and has a width of about 2 to 4 mm and a depth of about 1 to 2 mm, which is continuously provided around substantially the entire circumference of the flange 11, as shown in FIG. 3.

As shown in FIG. 2, the groove 16 is provided in the flange 11 such that the width L1 of a joint surface 17 formed at the inner periphery of the groove 16 (inner-periphery-side joint surface) and the width L2 of a joint surface 18 formed at the outer periphery of the groove 16 (outer-periphery-side joint surface) satisfies the relationship L1<L2. Furthermore, the groove 16 is integrally formed by casting when the aluminum-die-cast motor housing 3 is formed by die-casting.

Figure 4:
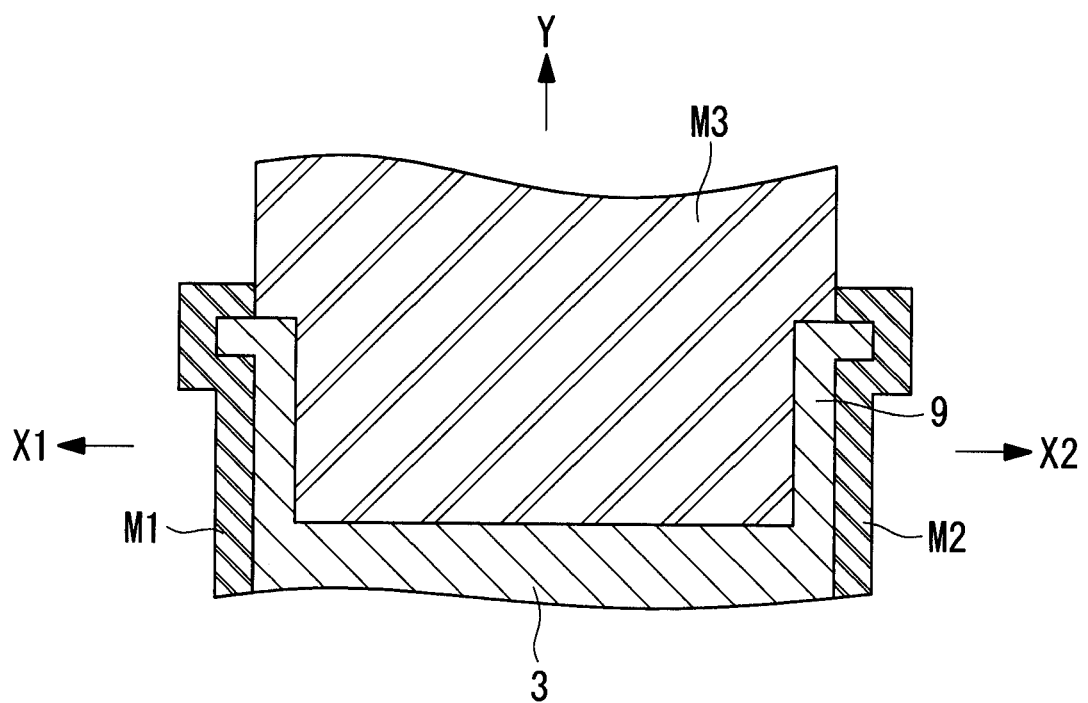
FIG. 4 is a conceptual diagram showing a state in which the motor housing of the integrated-inverter electric compressor shown in FIG. 1 is formed by die-casting.

Specifically, the inverter accommodating section 9 integrally formed around the outer periphery of the motor housing 3 is formed by die-casting using a pair of right and left outer dies M1 and M2 that form the outer shape of the motor housing 3 and an inner die M3 that forms an inverter accommodating space, as shown in FIG. 4. The inner die M3 is separated in the direction of arrow Y, and at that time, the flange 11 of the motor housing 3 is held by the outer dies M1 and M2 that are separated in the directions of arrows X1 and X2. Therefore, the parting line P/L between the outer dies M1 and M2 and the inner die M3 is formed on the joint surface of the flange 11, as indicated by the two-dot chain line in FIG. 3, and the groove 16 is formed around the inner periphery of the parting line P/L by the inner die M3.

Accordingly, when the groove 16 is integrally formed by casting during die-casting, the widths L1 and L2 of the joint surface 17 formed at the inner periphery of the groove 16 and the joint surface 18 formed at the outer periphery inevitably satisfy L1<L2. Furthermore, the flange 11 is provided with a plurality of screw holes 19 at a predetermined pitch for fixing the cover 13 with the screws 12. The screw holes 19 are, as shown in FIG. 3, provided at the outer periphery of the groove 16 and are configured to fasten the cover 13 with the screws 12, at the outer periphery of the groove 16 that is to be filled with the liquid sealant 20. Furthermore, for tapping the screw holes 19, it is necessary to provide concave surfaces for prepared holes in the flange 11. These concave surfaces for the prepared holes are also formed at the inner periphery of the parting line P/L together with the groove 16 using the inner die M3.

With the configuration described above, this embodiment provides the following operational advantages.

After installing the inverter 14 in the inverter accommodating section 9, the remaining space is filled with a moisture-proof vibration-proof gel, and then the opening 10 of the inverter accommodating section 9 is tightly sealed by fastening the cover 13, made of a damping steel plate, to the flange 11 with the screws 12. Here, first, the curable liquid sealant 20 called a liquid gasket is filled into the groove 16 provided in the flange 11. Next, the cover 13 is brought into pressure-contact with the joint surfaces 17 and 18 of the flange 11 and is fastened thereto with the screws 12 and the screw holes 19. In this state, the liquid sealant 20 is cured, so that the cover 13 is tightly sealed to the flange 11.

Here, part of the liquid sealant 20 filled in the groove 16 is pressed out from the groove 16 due to the pressure-contact of the cover 13. The pressed-out liquid sealant 20 is pressed out mainly to the inner-periphery-side joint surface 17 owing to a difference in resistance due to the difference between the width L1 of the joint surface 17 formed at the inner periphery of the groove 16 and the width L2 of the joint surface 18 formed at the outer periphery of the groove 16 because the relationship between the widths L1 and L2 is set at L1<L2, and remains at the inner peripheral edge due to surface tension, where it is cured (see FIG. 2).

Therefore, according to this embodiment, the inverter accommodating section 9 can be sealed with the cover 13 by curing the sealant 20 at the two positions, that is, the groove 16 and the inner peripheral edge of the flange 11 (see FIG. 2), to form double sealing films, thereby ensuring a sufficient width. This can therefore reliably enhance the waterproofing performance of the inverter accommodating section 9 and can prevent the sealant 20 from being squeezed out to the outer peripheral surface of the electric compressor 1, thus improving the external appearance.

Furthermore, the groove 16 is integrally formed by casting in the flange 11 of the inverter accommodating section 9 when the motor housing 3 is formed by die-casting. This therefore eliminates the need for processing the groove 16 in the flange 11 by machining, thus allowing the groove 16 to be integrally formed by casting when the inverter accommodating section 9 is formed by die-casting together with the motor housing 3. This can therefore remarkably enhance the productivity as compared with forming the groove 16 by machining, thus reducing the production cost. Furthermore, by integrally forming the groove 16 by casting, the width L2 of the joint surface 18 at the outer periphery of the groove 16 can inevitably be wider than the width L1 of the inner-periphery-side joint surface 17 (L1<L2) because of the construction of the molding dies.

Furthermore, the groove 16 is provided at the inner periphery of the plurality of cover-mounting screw holes 19 provided in the flange 11. Therefore, this allows the continuous groove 16 to be easily formed around substantially the whole circumference of the flange 11 without being obstructed by the screw holes 19. This can therefore enhance the sealing performance and can decrease the length of the groove 16 as much as possible, thereby minimizing the usage of the liquid sealant 20 necessary for sealing. Furthermore, since the cover 13 is fastened with the screw holes 19 provided at the outer periphery of the groove 16, the sealant 20 can be reliably prevented from being squeezed out to the outer peripheral surface of the compressor. Furthermore, since a large area can be allocated to a portion of the flange 11 to be held by the outer dies M1 and M2 during die-casting, the position of the work during releasing can be stabilized.

Furthermore, the cover 13 is constituted of a damping steel plate. Therefore, this can not only improve the waterproofing performance of the inverter accommodating section 9 but also reduce vibrations and noise emitted outside through the inverter accommodating section 9 by the cover 13 made of a damping steel plate. Accordingly, despite the use of the damping steel plate making it substantially difficult to process the cover 13 to enhance the waterproofing performance, the waterproofing performance can be enhanced, and vibrations and noise can be reduced.

Second Embodiment

Next, a second embodiment of the present invention will be described using FIG. 5.

This embodiment differs from the above-described first embodiment in that a minute gap D1 is formed between the joint surface 17 of the flange 11 and the cover 13. Since the other features are the same as those of the first embodiment, descriptions thereof will be omitted.

Figure 5:
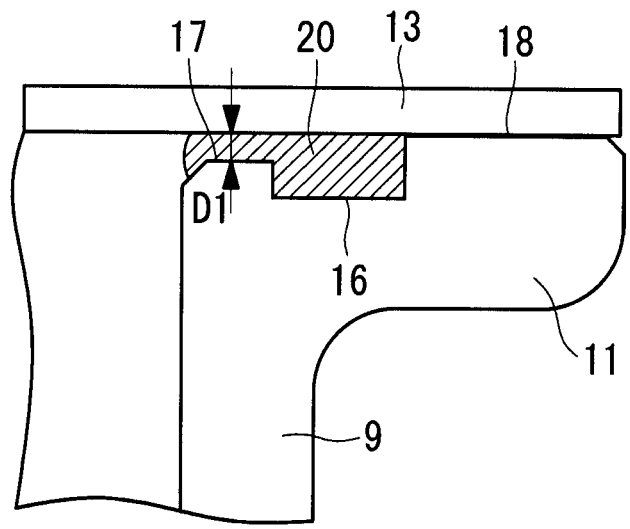
FIG. 5 is a cross-sectional view, of a portion corresponding to FIG. 2, of an integrated-inverter electric compressor according to a second embodiment of the present invention.

In this embodiment, as shown in FIG. 5, the flange 11 of the inverter accommodating section 9 is configured such that the joint surface 17 formed at the inner periphery of the groove 16 is lower than the joint surface 18 formed at the outer periphery of the groove 16 to form the minute gap D1 between the joint surface 17 and the cover 13. About 0.1 mm is adequate for the minute gap D1. In FIG. 5, the size of the gap D1 is exaggerated.

Since the flange 11 is configured such that the joint surface 17 formed at the inner periphery of the groove 16 is lower than the joint surface 18 formed at the outer periphery of the groove 16 to form the minute gap D1 between the joint surface 17 and the cover 13, as described above, the liquid sealant 20 pressed out from the groove 16 due to contact pressure when the cover 13 is fastened can be reliably introduced to the inner-periphery-side joint surface 17 through the minute gap D1 formed between the inner-periphery-side joint surface 17 and the cover 13. This allows the liquid sealant 20 to be cured at two positions, that is, the groove 16 and the inner peripheral edge of the flange 11, to form double sealing films, thereby tightly sealing the inverter accommodating section 9 with the cover 13. Thus, this can further enhance the waterproofing performance of the inverter accommodating section 9.

Third Embodiment

Next, a third embodiment of the present invention will be described using FIG. 6.

This embodiment differs from the above-described first and second embodiments in that a second groove 21 is provided in the joint surface 17 of the flange 11. Since the other features are the same as those of the first and second embodiments, descriptions thereof will be omitted.

Figure 6:
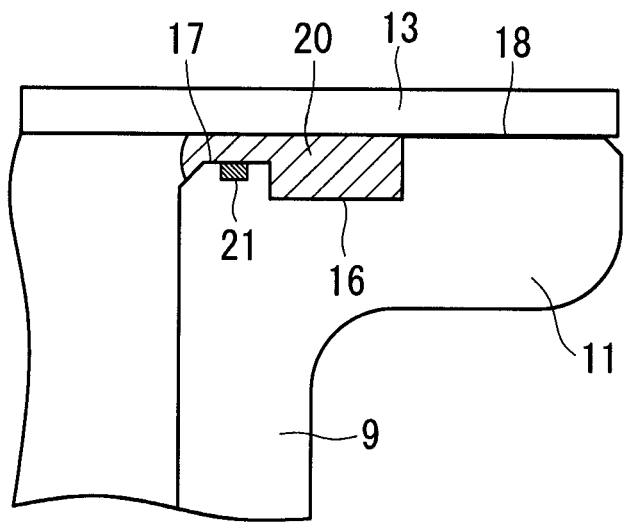
FIG. 6 is a cross-sectional view, of a portion corresponding to FIG. 2, of an integrated-inverter electric compressor according to a third embodiment of the present invention.

In this embodiment, as shown in FIG. 6, the flange 11 of the inverter accommodating section 9 is configured such that the second groove 21, which is sufficiently smaller than the groove 16, is provided in the joint surface 17 formed at the inner periphery of the groove 16.

The second groove 21 can be formed of a groove having a width and depth about one half to one third of those of the groove 16 having a width of about 2 to 4 mm and a depth of about 1 to 2 mm. Furthermore, the second groove 21 may be applied in combination with either of the foregoing first and second embodiments.

Since the flange 11 has the second groove 21, which is smaller than the groove 16 to be filled with the liquid sealant 20, in the joint surface 17 at the inner periphery of the groove 16, as described above, the liquid sealant 20 pressed out from the groove 16 due to contact pressure when the cover 13 is fastened can be collected in the second groove 22 provided in the inner-periphery-side joint surface 17, and the liquid sealant 20 can be cured in the two inside and outside grooves 16 and 21. Thus, double sealing films can be formed to thereby tightly seal the inverter accommodating section 9 with the cover 13. Thus, this can further enhance the waterproofing performance of the inverter accommodating section 9.

The present invention is not limited to the present invention according to the embodiments described above, and modifications can be made as appropriate without departing from the spirit thereof. For example, in the above embodiments, although the cover 13 is made of a damping steel plate, the cover 13 is not necessarily made of the damping steel plate. Although it is difficult to form a groove or the like in the damping steel plate itself, a groove or the like can easily be formed in the damping steel plate if the cover 13 is made of a steel plate, an aluminum plate, or the like. Accordingly, the cover 13 may be constituted of a steel plate, an aluminum plate, or the like, and the groove in which a sealing film made of the liquid sealant 20 is to be formed may be provided at the cover side.

In the above embodiments, although an example in which the groove 16 is integrally formed by casting is described, it is needless to say that the present invention includes a groove 16 formed by machining. Furthermore, in the above embodiments, although an example in which the inverter accommodating section 9 is formed integrally with the motor housing 3 is described, the inverter accommodating section 9 may be a separate component and may be integrally mounted to the motor housing 3.

REFERENCE SIGNS LIST 1 integrated-inverter electric compressor
2 housing 3 motor housing
9 inverter accommodating section
10 opening
11 flange
13 cover
14 inverter
16 groove
17 inner-periphery-side joint surface
18 outer-periphery-side joint surface
19 screw hole
20 liquid sealant
21 second groove
L1 width of joint surface 17
L2 width of joint surface 18

The invention claimed is:

1. An integrated-inverter electric compressor in which an inverter accommodating section is provided on the periphery of a housing accommodating an electric motor and a compression mechanism, an inverter that supplies driving power to the electric motor is installed in the inverter accommodating section, and the accommodating section opening is tightly sealed with a cover, wherein
    a groove in which a liquid sealant is to be filled is provided in a flange around the opening of the inverter accommodating section; the liquid sealant filled in the groove is cured to tightly seal a joint surface between the flange and the cover; and when the width of a joint surface formed at the inner periphery of the groove in the flange is L1 and the width of a joint surface formed at the outer periphery of the groove is L2, L1<L2 holds;
    wherein the flange is provided at two opposite sides adjacent of the groove,
    wherein the flange is configured such that the joint surface formed at the inner periphery of the groove is lower than the joint surface formed at the outer periphery of the groove,
    wherein the flange has a second groove, which is smaller than the groove, in the lower joint surface formed at the inner periphery of the groove.

2. The integrated-inverter electric compressor according to claim 1, wherein the groove is integrally formed by casting, in the flange of the inverter accommodating section during die-casting.

3. The integrated-inverter electric compressor according to claim 1, wherein the groove is provided at the inner periphery of screw holes provided in the flange for mounting the cover.

4. The integrated-inverter electric compressor according to claim 1, wherein the cover is constituted of a damping steel plate.

* * * * *